United States Patent [19]

Ziegler et al.

[11] 4,171,606
[45] Oct. 23, 1979

[54] ATTITUDE CONTROL FOR A HARVESTER PICKUP

[75] Inventors: Duane H. Ziegler, Moline; Dennis A. Kerckhove, East Moline, both of Ill.

[73] Assignee: Deere & Company, Moline, Ill.

[21] Appl. No.: 920,999

[22] Filed: Jun. 30, 1978

[51] Int. Cl.$^2$ .................................. A01D 67/00
[52] U.S. Cl. .................................. 56/10.2; 56/364; 56/DIG. 15
[58] Field of Search ............... 56/10.2, 10.4, DIG. 15, 56/364, 208

[56] References Cited

U.S. PATENT DOCUMENTS

| | | | |
|---|---|---|---|
| 3,851,451 | 12/1974 | Agness et al. | 56/10.2 |
| 3,975,890 | 8/1976 | Rodger | 56/10.2 |

*Primary Examiner*—Jay N. Eskovitz

[57] ABSTRACT

An automatic attitude control system is disclosed for a harvester having a crop pickup connected for pivoting about a transverse axis near the forward end of a crop-gathering head. The system automatically raises or lowers the crop-gathering head to maintain the angle between the upper run of the pickup belt or conveyor and the head within preselected angular limits to assure proper feeding of the crop from the pickup to a transverse auger or the like on the head. Two sensors are provided, each with a plurality of reed switches, including a group of parallel "raise" switches and a group of parallel "lower" switches, and a magnetic actuator mounted for relative movement with respect to the switches as the pickup pivots with respect to the head. The sensor switches are connected to a circuit for activating a control valve for the head cylinders to raise the head when one or more of the switches in either of the "raise" groups are closed by the actuator. The control valve is actuated to lower the head when at least one of the switches in each of the "lower" groups is closed. A magnetic shorting bar is positioned between the "raise" and "lower" groups to prevent actuation of any of the switches by the magnetic actuator when the angle between the head and the pickup is within the preselected limits.

10 Claims, 6 Drawing Figures

ATTITUDE CONTROL FOR A HARVESTER PICKUP

BACKGROUND OF THE INVENTION

The present invention relates generally to a crop harvester and more specifically to an attitude control system for a crop-gathering head having a pivotally connected pickup.

In the following specification and in the drawings, the crop harvester will be described and illustrated as a combine, but those skilled in the art will recognize the attitude control system of the present invention can be used with other implements.

When combining certain crops, it is desirable to maintain the pickup for the crop-gathering head a predetermined distance above the ground. For example, when a belt or conveyor type of pickup is used in the windrow pickup method of harvest, the height of the forward end of the pickup is regulated through gauge wheels located on either side of the unit. The pickup is pivotally connected about a generally horizontal transverse axis near the front of the crop-gathering head to allow the forward end to move up and down. The gauge wheels are adjusted just low enough to allow fingers located on the belt to gather in the grain, but high enough so that the fingers do not dig into the ground. The gauge wheels follow the ground contour raising and lowering the forward end of the pickup as necessary to maintain the predetermined distance. The angle between the pickup and the head changes as the gauge wheels follow the contour and/or as the head is raised and lowered.

The crop-gathering head includes an elongated harvesting platform. An auger rotates above the platform to draw the material conveyed by the pickup from the ground into a crop transferring opening. In this and similar type units, there is an optimum angle between the upper run of the pickup conveyor and the plane of the harvesting platform for most effectively feeding the material from the pickup to the auger. If the angle is increased beyond the optimum, the material is directed too far above the platform and above the centerline of the auger, which often results in bunching and slugging as the material travels in a loop before moving under the auger. In some cases the material is thrown over, rather than toward the lower front portion of the auger, causing backfeeding and possible jamming of the gathering head. If the angle between the platform and head is reduced too far below the optimum angle, the material is directed downwardly towards the platform and too far below the axis of the auger, breaking up the natural flow pattern from the pickup to the auger. The orientation of the stems or stalks is affected thus hampering effective flow through the auger. Bunching and slugging can occur with improper orientation of the pickup with respect to the crop-gathering head, particularly in long straw conditions.

To maintain the correct angle, the operator has to watch the pickup and the head, and when the angle increases or decreases from an optimum range, the head has to be lowered or raised, respectively, to cause the pickup to pivot on the head to maintain the desired angular relationship. An operator controlled hydraulic cylinder is activated to reposition the head and re-establish the angular relationship. Constant monitoring of the angle is fatiguing, especially where a harvester is being drawn by a tractor and the operator must turn around to view the machine. In areas where the ground is uneven or rolling, the angle between the pickup and head will continually deviate from the optimum range. In many instances, the operator simply fails to adjust the height of the head to maintain the proper attitude with respect to the pickup and bunching, slugging or backfeeding results.

In addition to directing the material to the auger properly, correct attitude of the pickup also assures that few rocks or other foreign material will be conveyed to the platform. In certain types of belt pickups, such as shown in U.S. Pat. No. 3,474,605, the conveyor has an upper run which is divided into a forward portion with a substantial inclination to prevent rocks and other foreign material from being picked up, and a rearward substantially horizontal portion so the crop is fed to the lower portion of the auger. In order to maintain the proper pickup pitch, the head height must be properly adjusted. If the head is too low, the inclination of the forward portion will be decreased, allowing more foreign material to enter the platform area. The rearward portion will be angled downwardly from the horizontal, directing the windrow below the optimum point on the auger. If the head is too high, the rearward portion of the pickup will be angled above the horizontal, impelling the windrow above the centerline of the auger and resulting in slugging or uneven feeding, as discussed above.

SUMMARY OF THE INVENTION

It is therefore an object of the invention to provide an automatic control for maintaining the proper attitude between a crop pickup conveyor and a grain harvesting platform.

It is a further object to provide an automatic height control for a crop-gathering head having a pickup pivotally connected thereto. A sensor provides an output when the angle between the head and the pickup varies outside of a preselected range. The output is used to activate an electrohydraulic control connected to the hydraulic cylinder that raises or lowers the head to cause the pickup to pivot, returning the angle to within the range.

It is still a further object to provide an automatic height control for a head with a pickup pivotally connected thereto which includes a sensing device having a plurality of switches and an activator mounted for relative movement with respect to the switches as the pickup pivots so that at least a first switch is activated when the angle between the pickup and the head exceeds an upper preselected limit and a second switch is activated when the angle falls below a lower preselected limit. The switches are connected to circuitry which controls a hydraulic valve that controls the hydraulic cylinders to raise or lower the head and cause the pickup to pivot to within the preselected angular limits. The actuator includes a magnetic member connected to the pickup. Reed switches are mounted on the head and are adjacent to the actuator when the pickup is in operating position. The switches and actuator are physically separated from each other so that during transporting of the implement the pickup can be pivoted outside of the preselected angular limits without interference from the sensing device.

The above objects and additional objects and advantages of the present invention will become apparent, along with the details of construction of a preferred embodiment of the invention from a reading of the following detailed description when taken in conjunction with the accompanying drawings.

DESCRIPTION OF THE PREFERRED EMBODIMENT

Figure 1:
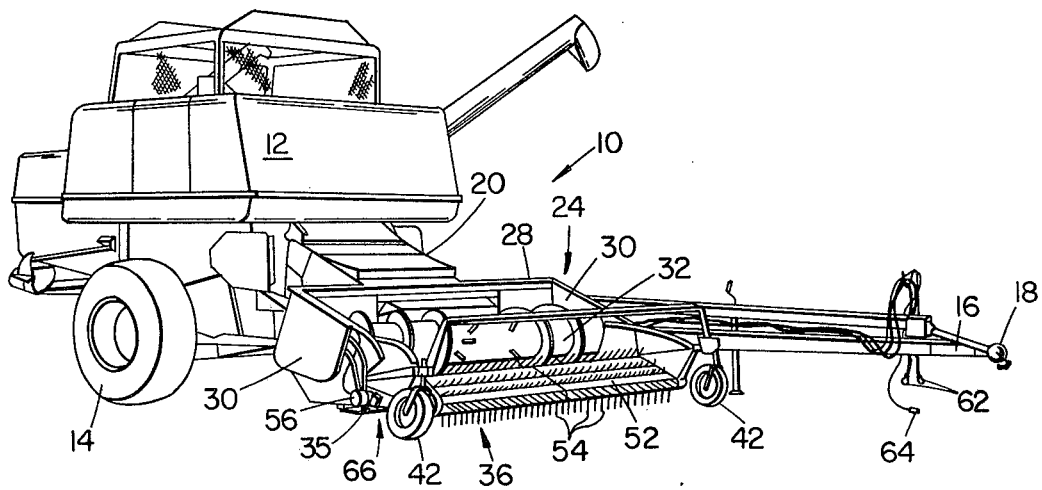
FIG. 1 is a right front perspective view of a combine with which the device of the present invention is utilized.

Referring now to the drawings, a combine indicated generally by the numeral 10 includes a main body section 12 supported on wheels 14. A pull type combine having a hitch 16 for connecting to a tractor is shown, but the device of the present invention can be used equally well with a self-propelled combine, as well as other similar implements. Drive for the combine is supplied through a power take-off shaft 18 connected to the tractor PTO.

Pivotally connected to the forward end of the body 12 for movement about a transverse axis 19 is a feeder house 20 for conveying material rearwardly. A pair of hydraulic cylinders 22 are connected between the body 12 and the feeder house 20. A crop-gathering head 24 with a substantially horizontal transverse pickup platform 26 mounts at the front of the feeder house 20 for vertical movement therewith as the hydraulic cylinders 22 are extended or retracted. The head 24 includes a frame 28, side walls 30, and a transverse auger 32 journaled between the side walls above the platform 26 on a shaft 34. Skid shoes 35 are mounted on opposite sides of the head 24.

A crop pickup assembly 36 including a frame 38 is secured to the forward end of head 24 for swinging about a transverse axis 40. The forward end of the pickup 36 is vertically adjustable and is supported above the ground by a pair of gauge wheels 42 mounted on opposite sides of the pickup by support members 44 connected to frame 38.

A rearward transverse roller 46 is journaled at opposite ends of the pickup frame 38 for rotation about the transverse axis 40. The shaft for the roller 46 is also journaled on the upright members 47 connected to the frame 28 above skid shoes 35, and serves as a pivot connection between the head 24 and the pickup 36. A forward roller 48 is journaled to the frame 38 parallel to the roller 46. An intermediate roller 50 is located between the forward and rear rollers, substantially above the forward roller but on substantially the same horizontal plane as the rear roller when the unit is in operation. An endless belt 52 carrying fingers 54 is trained around the rollers 46, 48 and 50 and is driven in a clockwise direction, as viewed in FIG. 2, by a hydrostatic drive 56 connected to the rear roller 46. A rear upper run section 58 is located substantially in a horizontal plane which intersects the auger 32 below the axis of auger shaft 34 when the pickup 36 is in operating position. A forward upper run section 60 is inclined rearwardly and upwardly from the ground toward the section 58. A hold-down unit 61 is supported from the members 44 and extends above belt 52.

Hydraulic hoses 62 are provided for connection with the tractor to supply fluid under pressure to the hydraulic drives and cylinders on the combine 10. An umbilical cable 64 is provided for connection to the electrical supply and control system on the tractor.

The above-described combine is all of conventional structure and is illustrated and described only to provide a specific example of an implement with which one specific embodiment of the invention to be hereinafter described can be used.

Figure 3:
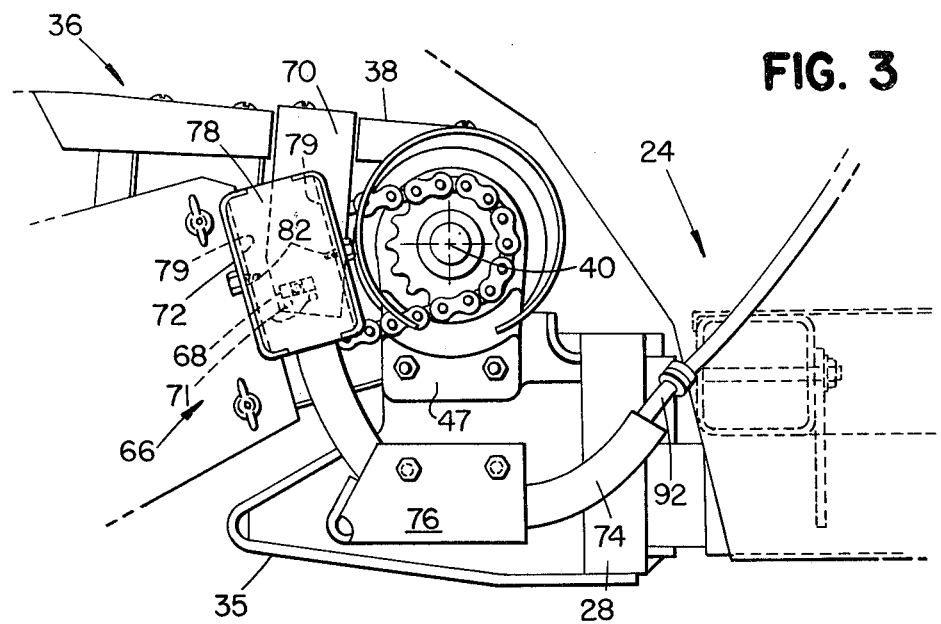
FIG. 3 is an enlarged side elevational view of an attitude sensor according to the present invention connected to the left forward portion of the combine.
Figure 4:
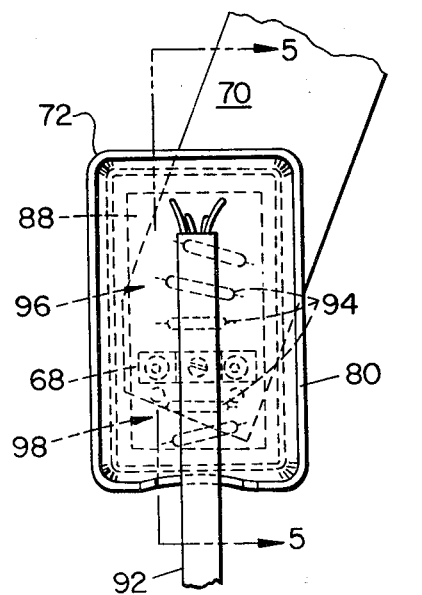
FIG. 4 is a side elevational view of the attitude sensor shown in FIG. 3, with the tubing and plate removed from the switch member.
Figure 5:
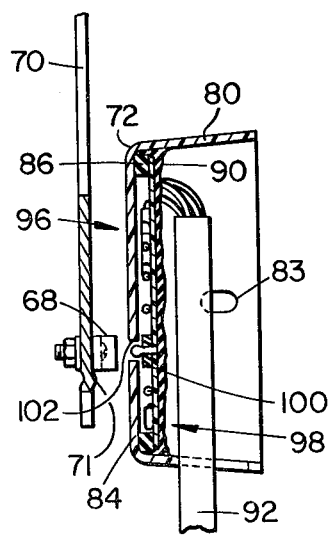
FIG. 5 is a sectional view taken along the lines 5—5 of FIG. 4.

The attitude control system according to the present invention includes preferably two sensor units 66, one located on either side of the pickup 36 in the vicinity of the transverse axis 40. The sensor units are essentially the same, and so only the lefthand side unit will be discussed in detail. The sensor unit 66, as best seen in FIG. 3, includes an actuator member or magnet 68 bolted or riveted to a bracket 70. The bracket 70 is bolted to the pickup frame 38 with the magnet 68 facing outwardly. The magnet preferably is made from a material such as Alnico and includes a grooved central portion with a bolt-receiving hole between upstanding pole portions of opposite polarity. The bracket 70 includes locating dimples 71 to aid in placement of the magnet 68.

The sensor unit 66 also includes a switch member 72 which is adjacent to but spaced outwardly from the magnetic actuator member 68. A support tubing 74 is mounted on the crop-gathering head 24 by a bracket 76 bolted to the frame 28 near the skid shoe 35. A flat plate member 78 having perpendicular downwardly facing ears 79 is welded to the tubing 74, and a plastic switch housing 80 is connected thereto by two self-tapping metal screws 82, each passing through a slot 83 in the housing and through an ear 79 of the plate 78. The housing 80 has an open box configuration with an inwardly facing wall 84. Mounted on an inner circumferential board support member 86 near the wall 84 and essentially parallel thereto is a printed circuit board 88 sealed in place by a silicone elastomer or similar material 90. A multiconductor cable 92 is connected to the printed circuit board 88 and extends through the support tubing 74 (FIG. 3).

The printed circuit board 88 carries a plurality of single pole-single, single-throw normally open magnetic reed switches 94 including a group of parallel "raise" switches 96 and a group of parallel "lower" switches 98. Riveted to and extending across the width of the board 88 between the groups 96 and 98 is a sheet steel magnetic shorting member 100. A locating slot 102 is provided in the plastic switch housing 80 adjacent to the member 100.

Each switch 94 and the shorting member 100 are located on board 88 on an arc with the axis of each switch extending substantially along a radial line of the arc. When crop pickup 36 is in the desired operating position, the magnetic actuator 68 is directly across from and parallel to magnetic shorting member 100. As the pickup pivots with respect to the head 24, the path of the actuator 68 is in close proximity to the switches 94, with the longitudinal axis of the member 68 essentially parallel to the axis of any adjacent switch 94.

Figure 6:
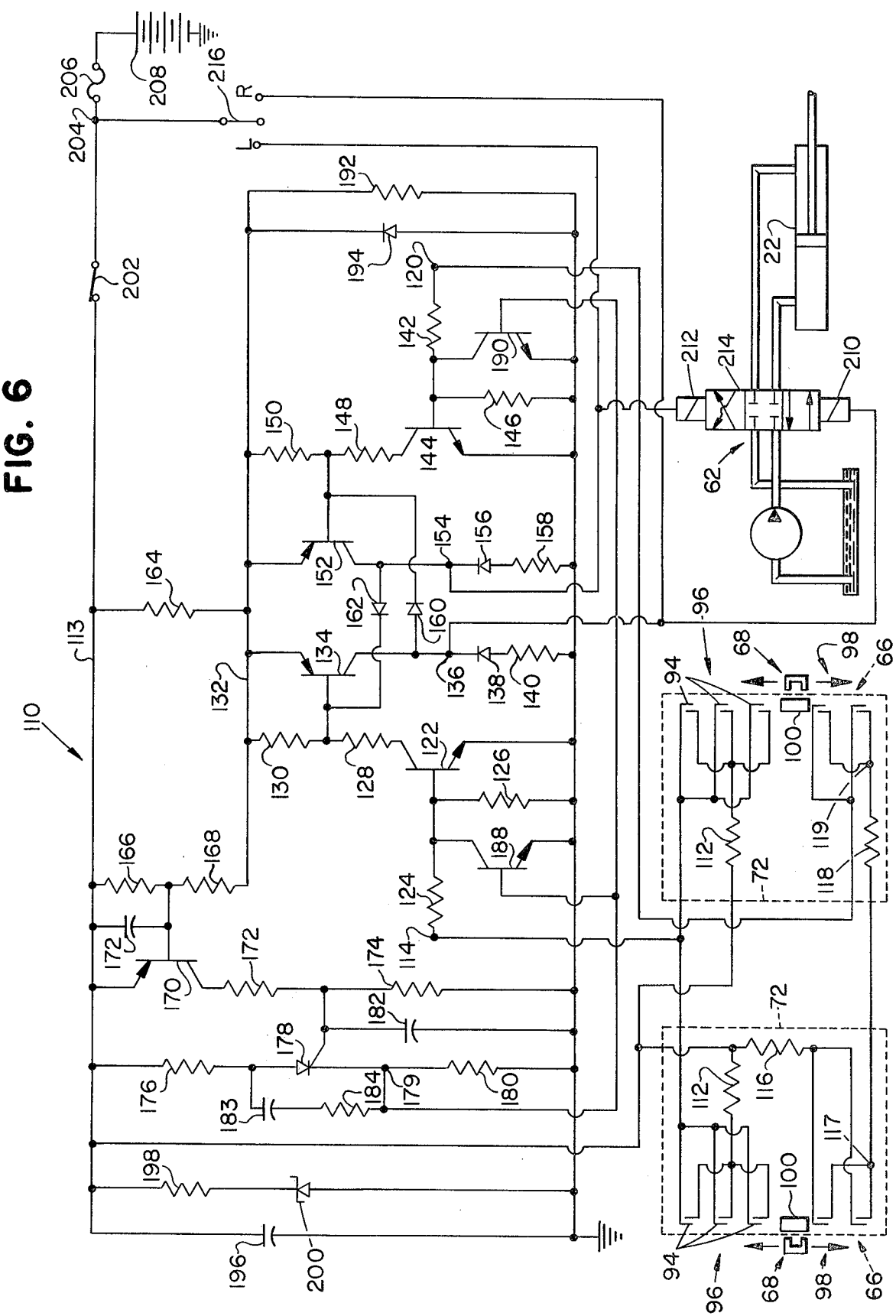
FIG. 6 is a schematic illustration of the electrical system of the automatic attitude control system.

For each of the left-hand and right-hand sensor units 66, a cable 92 extends through the support tubing 74 and connects the switches 94 on the printed circuit board 88 with a circuit 110 housed in a metal box 104 mounted on the rear of the head 24. In the preferred embodiment as best seen in FIG. 6, the "raise" switch group 96 of each sensor switch member 72 includes three reed switches 94 connected in parallel. A resistor 112 connects one terminal of each group 96 with the power supply line 113. The other terminal of each group 96 is connected to a "raise" input terminal 114 of circuit 110. Therefore, the groups of "raise" switches 96 are connected in "OR" gate fashion between the power supply line 113 and the "raise" terminal 114. The closing of any one or more of the "raise" switches by an actuator 68 raises the voltage at terminal 114 to near the level on power supply line 113.

Each sensor switch member 72 also has a "lower" switch group 98 preferably including at least two reed switches 94 connected in parallel. In one of the sensors one terminal of the "lower" switch group 98 is connected to the supply line 113 through a resistor 116. The other terminal 117 of group 98 is connected through resistor 118 to a terminal 119 of the "lower" switches 98 for the opposite sensor switch member 72. The remaining terminal at group 98 is connected to a "lower" input terminal 120 of circuit 110. Therefore, the "lower" switch groups 98 are connected in "AND" gate fashion between the power supply line 113 and the "lower" terminal 120 of the circuit 110 so at least one of the "lower" switches in each sensor unit 66 must be closed by the actuators 68 to raise the voltage at terminal 120 to near the level on the line 113.

The "raise" terminal 114 of the circuit 110 is connected to the base of a NPN transistor 122 through a resistor 124. A resistor 126 is connected between the base and ground. The emitter of the transistor 122 is grounded, and the collector is connected to one end of a voltage divider including resistors 128 and 130. The other end of the divider is connected to a source of voltage on the line 132. The emitter of a PNP transistor 134 is connected to the line 132 with the base connected between the resistors 128 and 130. The collector of the transistor 134 is connected to a "raise" output terminal 136. A protection diode 138 is connected in series with a resistor 140 between the terminal 136 and ground.

A circuit similar to the one just described is connected to the "lower" terminal 120. A resistor 142 is connected between the base of a NPN transistor 144 and the terminal 120. The base of the transistor 144 is connected to ground through a resistor 146 and the emitter is grounded. A voltage divider including resistors 148 and 150 is connected between the line 132 and the collector. A PNP transistor 152 has its emitter connected to the line 132 and its base connected between the resistors 148 and 150. The collector of transistor 152 is connected to a "lower" output terminal 154 and to a diode 156 which is in series with a resistor 158 connected to ground.

The collector of transistor 134 is connected through a diode 160 to the base of the transistor 152. The collector of transistor 152 is connected to the base of transistor 134 through a diode 162.

The line 132 is connected to the power supply line 113 through a current sensing resistor 164 in parallel with series connected resistor 166 and 168. A PNP transistor 170 has its base connected between the resistors 166 and 168 with the emitter connected to the power supply line 113. A capacitor 172 is connected in parallel with the resistor 166. The collector of the transistor 170 is connected to ground through a series leg including resistors 173 and 174. A resistor 176 is connected between the power supply line 113 and a SCR 178. The output terminal 179 of the SCR is connected to ground through a resistor 180. The gate of SCR 178 is connected between the resistors 172 and 173 and to a capacitor 182 which is in parallel with the resistor 174. In parallel with SCR 178 is a standard snubber circuit including a capacitor 183 and a resistor 184. Terminal 179 is also connected to the bases of transistors 188 and 190, each of which has a grounded emitter. The collector of transistor 188 is connected to the base of transistor 122, and the collector of transistor 190 is connected to the base of transistor 144. A loading resistor 192 and a protection diode 194 are connected in parallel between the line 132 and ground. A filter capacitor 196 is connected between the supply line 113 and ground. A resistor 198 is connected in series with a Zener diode 200 between the supply line 113 and ground.

An on-off switch 202 mounted on the operator control panel is connected between a terminal 204 and supply line 113. A fuse 206 is connected between the terminal 204 and the positive terminal of power supply or battery 208, preferably a 12-volt battery on the tractor or combine. The negative terminal of supply 208 is connected to ground.

The output terminals 136 and 154 are connected to the "raise" and "lower" solenoids 210 and 212, respectively, which control the movement of a control valve 214 for the cylinders 22. A momentary single pole-double throw toggle switch 216 mounted on the operator control panel is connected between the terminal 204 and the output terminals 136 and 154. The switch contact labeled L is connected to terminal 154 and the contact labeled R is connected to terminal 136.

In operation, assuming initially that the switch 202 is in the "off" position, the operator can raise or lower the crop-gathering head 24 by switching the toggle switch 216 to the R or to the L positions, respectively. When the switch 216 is moved to the L position, the solenoid 212 is actuated and the cylinders 22 retract to lower the head 24. The solenoid 210 is actuated when the toggle switch 216 is moved to the R position, and the cylinders 22 are extended, raising the head 24. While the combine is in transit, the switch 202 is in the "off" position, and the crop pickup assembly 36 can be pivoted about the axis 40 approximately 150° in the clockwise direction from the position shown in FIG. 2 to facilitate movement of the implement. During transportation, the hydraulic cylinders 22 are in the extended position to raise the head 24 well above ground. To ready the pickup 36 for operation, head 22 is lowered by operating switch 216. The pickup 36 is pivoted in a clockwise direction until the gauge wheels 42 contact the ground. The gauge wheels 42 are adjusted so that the fingers 54 can gather in the grain without digging into the ground.

Figure 2:
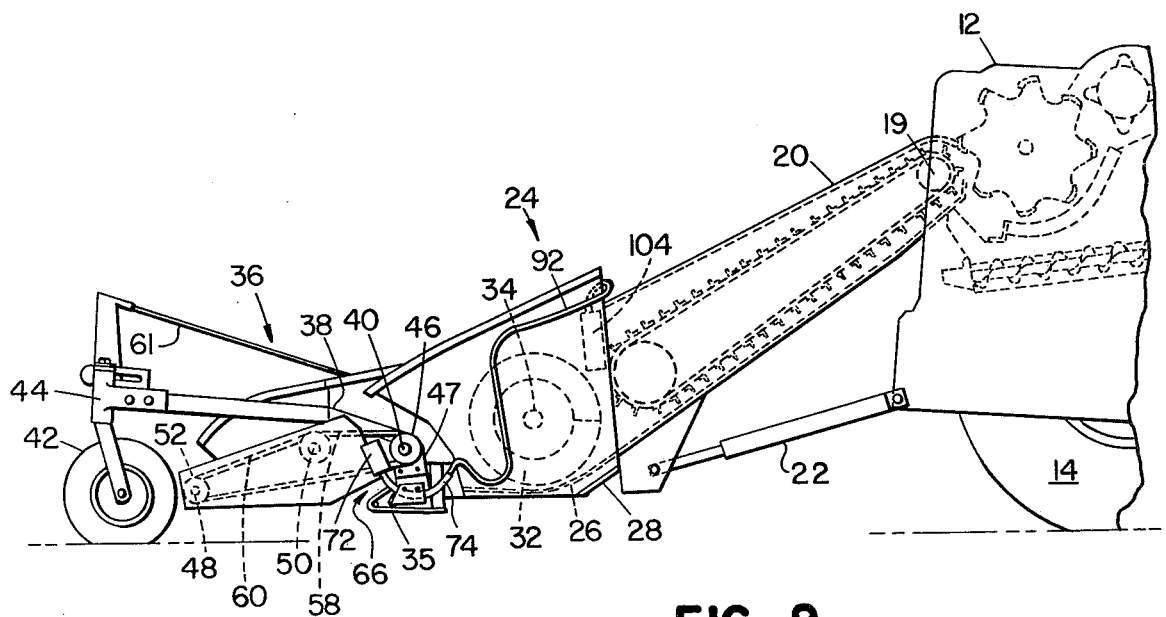
FIG. 2 is a side schematic view of the forward portion of the combine illustrated in FIG. 1 and showing the attitude of the pickup with respect to the head.

When the operator is ready to make a pass through the field, the switch 202 is closed supplying current to the circuit 110 from supply 208 and activating the automatic attitude control system. Assume first that the height of head 24 is above the ideal operating height so that pickup assembly 36 is pivoted too far in the counterclockwise position about the axis 40 (FIG. 2). Therefore, the material being picked up is directed from the rear upper run 58 to a point on the auger 32 above the axis of the shaft 34 rather than to a point below the axis of the shaft. The magnetic actuator 68 for each of the sensor units 66 is located across from one or more of the switches of switch group 98 closing at least one contact in each of the units. Since at least one relay is closed in each of the switch members 72, a closed path is provided from the power supply line 113 through the switch groups 98 to the "lower" terminal 120 of the circuit 110. Prior to the increased voltage signal at the terminal 120, the resistor 146 biases the transistor 144 off. Upon receipt of the voltage signal through the switch groups 98, the transistor 144 turns on and current is drawn through the resistor 148 and 150, lowering the base voltage at the transistor 152. The transistor 152 conducts supplying current to the terminal 154 which is connected to the "lower" solenoid 212 of the hydraulic valve 214. The solenoid actuates the valve so that the hydraulic cylinders 22 are retracted lowering the crop-gathering head 24 and thus causing the crop pickup assembly 36 to pivot in the clockwise direction (FIG. 2) about axis 40 so that rear upper run 58 of the belt 52 directs the crop below the axis of auger 32. The head 24 will lower until at least one of the magnetic actuator members 68 connected to the pickup 36 is positioned across from its shorting member 100 which provides a closed magnetic path for the actuator, causing the reed relay or relays to open. The path from the supply line 113 to the "lower" terminal 120 is then opened, and the base of transistor 144 returns to approximately ground level cutting off transistor 144. The base voltage at the transistor 152 rises to the level on line 132 and transistor 152 stops conducting. Current to solenoid 212 is cut off and the valve 214 returns to the hold position.

If head 24 is too low, pickup 36 will be pivoted too far in the clockwise direction about axis 40, causing the crop to be directed too low with respect to the axis of auger 32 and also causing the forward run section 60 of belt 52 to be inclined insufficiently to prevent rocks and other foreign material from entering the platform area. The magnetic actuator members 68 will be moved from their position adjacent shorting member 100 to a point across from the group of "raise" switches 96 so that one or more of the switches is closed. It should be noted that if a "raise" switch is closed in either of the switch members 72, the supply line 113 will be connected through the switch to the "raise" terminal 114 of circuit 110. The base voltage of the transistor 122 will be raised above ground turning the transistor on and drawing current through the resistors 128 and 130. The base voltage on the transistor 134 drops below turn-on and the transistor 34 conducts supplying current to the terminal 136 which is connected to the "raise" solenid 210. The solenoid 210 activates the valve 214 to extend the cylinders 22 and raise the head 24. The pickup 36 pivots in the counterclockwise direction about the axis 40 to increase the inclination of the forward run section 60 and again cause rear upper run 58 to direct the crop to the point just below the axis of auger 32. When pickup 36 has reached the proper angle with respect to the head 24, actuator members 68 again come under the influence of shorting members 100, and the reed relays in groups 96 open. The voltage at the base of transistor 122 returns to near ground level, the transistor stops conducting, and the base voltage of the transistor 134 rises above cut-off. No current is supplied to the solenoid 210 and the valve 214 returns to the hold position.

It should be noted here, that the "raise" switches 96 are connected in "AND" gate fashion so that movement of either actuator 68 away from shorting bar 100 towards a "raise" group 96 will cause the cylinder 122 to be extended to raise the head 24. However, since the "lower" group of switches 98 for one of the sensors 66 is connected in series with the group 98 of the other sensor 66, at least one switch in each of the groups 98 has to be closed to activate cylinder 22 to lower the head 24. This arrangement of switches assures that in uneven ground the head 24 will be raised sufficiently to keep the skid shoes 35 above the ground.

The toggle switch 216 assures the operator of manual override capability even when the switch 202 is in the "on" position. If he wishes to raise the head 24, for example when combining in rocky conditions when it is desirable to increase the inclination of the forward upper run section 60, he moves the toggle switch 216 to the R position thus connecting the voltage supply 208 with the "raise" solenoid 210. Diode 160 assures that the voltage at the base of transistor 152 rises to a point above cut-off so that both the outputs 136 and 154 cannot be on at the same time. The signal from the terminal 136 through the diode 160 overrides any signal on the terminal 120 which would otherwise cause the transistor 152 to conduct. The solenoid 210 is activated and the hydraulic cylinders 22 are extended to raise the head 24. As soon as the operator releases the toggle switch 216, it returns to the non-contacting center position and the automatic control simultaneously begins to operate again.

If the operator wishes to lower the head 24, he simply pushes the toggle switch to the L position to activate the solenoid 212, causing valve 214 to activate the cylinder to lower the head 24. Again, activation of the switch 216 overrides any control signals that may be coming from the sensor unit 66. The terminal 154 is connected through a diode to the base of the transistor 134 so that movement of the switch 216 to the L position forces the base of transistor 134 above cut-off. The diodes 160 and 162 thus assure that only one of the solenoids 210 or 212 is activated at one time. The diodes 138 and 156 provide a current path from ground through the solenoids 210 and 212 so that upon turn-off the inductive load of each does not pull the respective collectors below ground sufficiently to damage the transistors 134 and 152.

The current sensing resistor 164 senses the current drawn through the line 132, and if the value exceeds a preselected amount, the base voltage of transistor 170 connected between the voltage divider resistors 166 and 168 will drop below turn-on causing the transistor 170 to conduct and triggering the SCR 178. The SCR output terminal 179 goes positive turning on the transistors 188 and 190, assuring that the transistors 122 and 144 will be turned off. The transistors 134 and 152 will then be non-conducting thus disabling the automatic control system. Further protection is provided by the diode 194 which conducts sufficiently if the power supply input terminals are accidentally switched in polarity so that the fuse 206 will blow. The loading resistor 194 between the line 132 and ground provide bias for the current sensing network when no current is being drawn otherwise from the line. The voltage on supply line 113 is filtered by capacitor 196 and the Zener diode 200 provides voltage regulation and protects against voltage surges on the line 113.

In the preferred embodiment, a three-roller pickup 36 is used. It is desirable to keep the rear upper run section 58 in a generally horizontal position so that the plane of run 58 intersects the auger 32 just below the axis of the auger. When in this position, the actuator 68 of each sensor unit 66 is centered with respect to shorting bar 100, that is, positioned directly across from the shorting bar 100. The reed switches 94 and shorting bar 100 are arranged on the printed circuit board 88 such that angular movement beyond a preselected range, preferably about plus or minus 1½° from the centered position, will activate at least one of the switches. Since multiple read switches 94 are provided, the pickup unit 36 during operation of the combine cannot pivot so far that the actuator 68 cannot influence one of the reed switches 94 to close. However, the pickup unit 36 can be pivoted by the operator to a point approximately 150° clockwise from the position shown in FIG. 2 for transporting the combine. When the pickup unit 36 is thus pivoted the reed switches 94 are removed from the influence of the actuator members 68. The switches are also removed from the influence of the actuator members 68 when the pickup 36 is properly angled with respect to the head 24 so that the members 68 are magnetically shorted by the sheet steel members 100. Since the actuator member 68 and its associated switch member 72 are completely separate from each other, the pickup 36 is freely pivotable throughout its entire range, including to the folded transport position without having to disconnect any part the sensor units 66 from the combine frame. A stop (not shown) on the skid shoes 35 prevents pickup unit 36 which carries actuator members 68 from pivoting in the counterclockwise direction (FIG. 2) so the members 68 are beyond the range of the "lower" groups switches 98.

Support tubing 74 provides a rugged and convenient means for mounting the switch member 72 and at the same time provides a channel for protecting cable 92 which connects the switches 94 with the circuitry 110 on the rear of head 24. The magnetic reed switches 94 are protected from the hostile environment by the housing 80 and the plate 78.

We claim:

1. In a crop harvester with a vertically adjustable head having a transverse platform positionably secured thereto, an auger located above the platform, activatable hydraulic means for adjusting the head height, a crop pickup member pivotally connected near its rearward end about a transverse axis near the forward end of the head, and means for maintaining the forward end of the pickup member a preselected distance above the ground, an automatic attitude control system for maintaining the angle of the pickup member with respect to the platform within predetermined limits comprising:
    sensor means for sensing a deviation of the angle from the limits; and
    control means connected to the hydraulic means and responsive to the sensed deviation to activate the hydraulic means to change the head height so the pickup member pivots about the axis to reduce the deviation.

2. The invention disclosed in claim 1 wherein the sensor means comprises a switch member and a switch activating member variably positionable with respect to each other as the angle between the pickup member and the header varies.

3. The invention disclosed in claim 1 wherein the sensor means comprises first and second members, the first member positionably secured with respect to the platform and the second member positionably secured with respect to the pickup member in close but spaced relation to the first member so that the two members move with respect to each other as the angle changes.

4. The invention disclosed in claim 3 wherein one of the first and second members comprises a magnetic actuator member and the other member comprises a magnetically actuatable switch means, and wherein the switch means is actuated by the magnetic actuator member when the angle deviates from the limits.

5. In a harvester with a vertically positionable crop-gathering head, activator means for positioning the head, a crop pickup member connected near its rearward end for pivoting about a transverse axis near the forward end of the head, means for pivoting the pickup about the axis to maintain the front end of the pickup a preselected distance above the ground, automatic means for maintaining the angle between the head and the pickup member within preselected upper and lower limits comprising:
    sensor means for sensing the angle and providing a first signal when the angle exceeds the upper limit and a second signal when the angle falls below the lower limit; and
    control means connected between the sensor means and the actuator means and responsive to the first signal to lower the head and responsive to the second signal to raise the head.

6. The invention disclosed in claim 5 wherein the sensor means comprises a switch member having at least first and second switches and an actuating member proximate to and movable with respect to the switch member as the pickup member pivots so the first switch is actuated when the angle exceeds the upper limit and the second switch is actuated when the angle falls below the lower limit.

7. The invention disclosed in claim 5 wherein the sensor means comprises two sensor units, each having at least a first switch member activatable when the angle exceeds the upper limit and a second switch member activatable when the angle falls below the lower limit, and wherein the first switch members of the two sensor units are connected in series, and the second switch members are connected in parallel so that at least one first switch must be closed in each unit to provide the first signal and only one second switch need be closed to provide the second signal.

8. In a harvester having a vertically adjusting harvesting platform, hydraulic means for raising and lowering the platform, auger means having a transverse axis and supported above the platform to move the crop transversely, and a crop pickup member including a rearward end freely pivotally connected forwardly of the auger means and a forward section positioned a predetermined distance above the ground for removing a crop therefrom, means for automatically adjusting the height of the platform to maintain the angle of the crop pickup with respect to the harvesting platform within predetermined upper and lower angular limits comprising:
    a plurality of sensor units, each having a switch member and an actuator member adjacent to the switch member and mounted for relative movement with respect thereto as the pickup member pivots with respect to the platform, each switch member having a plurality of first switches at least one of which is activatable as the angle between the crop pickup and the platform drops below the lower limit, and a plurality of second switches at least one of which is activatable when the angle exceeds the upper limit, the first switches of one sensor unit being connected in parallel with the first switches of the second sensor unit and the second switches of the first sensor unit being connected in series with the second switches of the second sensor unit;

power supply means;

first circuit means connected to the hydraulic means and actuatable to cause the hydraulic means to raise the platform;

second circuit means connected to the hydraulic means and actuatable to lower the platform;

the first switches connected between the power supply means and the first circuit means to actuate the first circuit means when any of the first switches are closed, and the second switches connected between the power supply means and the second circuit means to actuate the second circuit means when at least one of the second switches in each of the sensor units is closed.

9. The invention disclosed in claim 8 further comprising manual operator means connected between the power supply means and the hydraulic means for manually controlling the hydraulic means for raising and lowering the platform regardless of the state of the first and second switches.

10. The invention disclosed in claim 8 wherein the switches comprise magnetically actuated reed switches mounted on the head and the actuator member includes a magnet mounted on the pickup member, each sensor unit further including a magnetic shorting member located between the first and second switches, and wherein the actuator member is positioned adjacent to the shorting member when the angle is within the predetermined limits.

* * * * *